United States Patent [19]

Muilwijk et al.

[11] 4,320,499
[45] Mar. 16, 1982

[54] SYSTEM FOR MULTI-LEVEL DATA TRANSMISSION BY MEANS OF AN ANGLE-MODULATED CARRIER HAVING A CONSTANT AMPLITUDE

[75] Inventors: Dirk Muilwijk, Hilversum; Cornelis B. Dekker; Frank de Jager, both of Eindhoven, all of Netherlands

[73] Assignee: U.S. Philips Corporation, New York, N.Y.

[21] Appl. No.: 129,796

[22] Filed: Mar. 12, 1980

[30] Foreign Application Priority Data

Mar. 8, 1979 [NL] Netherlands .................... 7901865

[51] Int. Cl.³ .................................. H04L 27/18
[52] U.S. Cl. ............................ 375/17; 375/53; 375/56; 375/85
[58] Field of Search ............... 375/17, 19, 44, 52, 375/53, 56, 57, 86; 371/56; 332/16 R; 340/170; 329/110

[56] References Cited

U.S. PATENT DOCUMENTS 3,818,135 6/1974 Tannhauser ..................... 375/56
4,109,101 8/1978 Mitani .............................. 375/53

Primary Examiner—Benedict V. Safourek
Attorney, Agent, or Firm—Thomas A. Briody; William J. Streeter; Edward W. Goodman

[57] ABSTRACT

A system for transmitting n-level data signals by means of an angle-modulated carrier having a constant amplitude and a continuous phase. The constant amplitude enables amplification in non-linear transmitter output stages. Associated with the n-levels are $k(k>n)$ phase variations in accordance with such a rule, depending on preceding phase variations, that the spectrum of the angle-modulated signal becomes narrower. In a symbol interval the phase of the carrier changes by an amount from the sequence extending from $-(k-1)\pi/n$ to $(k+1)\pi/n$ in increments of $2\pi/n$. The receiver is formed by a differential n-phase receiver. The system is used inter alia for radio transmission of digital information.

4 Claims, 32 Drawing Figures

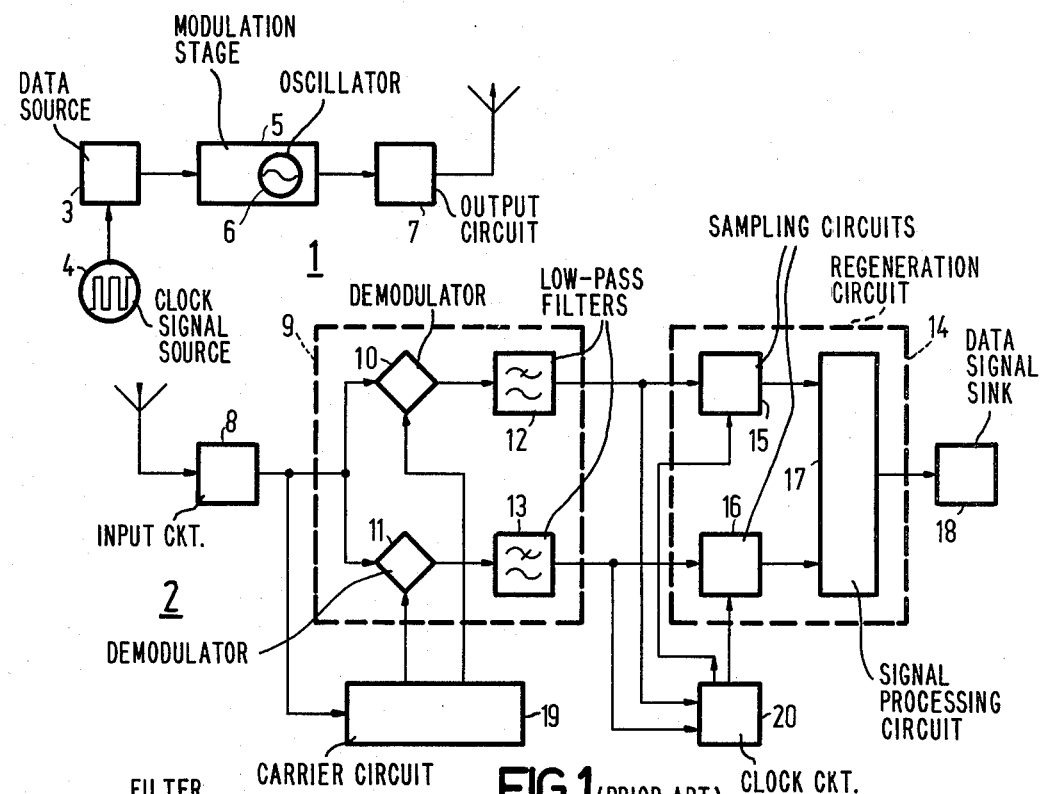
FIG.1 (PRIOR ART)
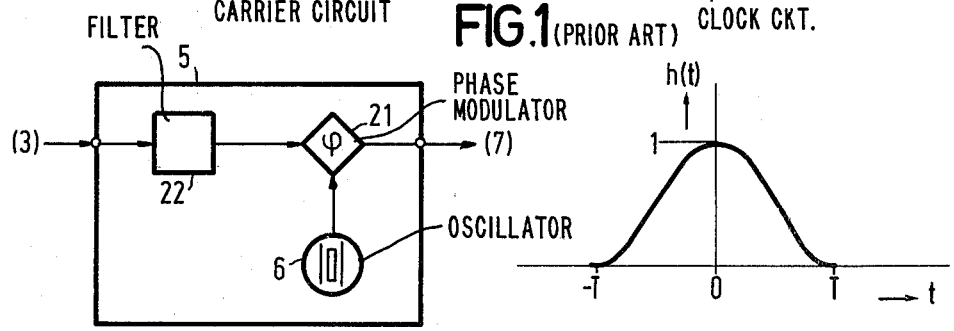
FIG.2 (PRIOR ART)
FIG.3
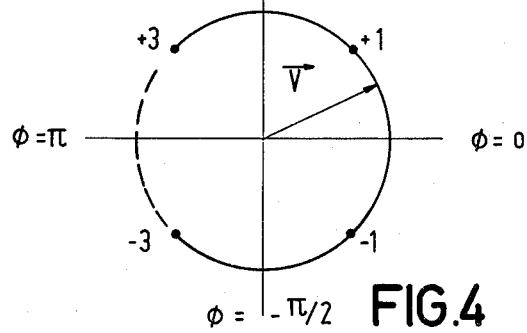
FIG.4

| t=(m+1)T | | t=mT | | a(m) |
|---|---|---|---|---|
| d | e | d | e | |
| + | + | − | − | "0" |
| − | + | + | − | |
| − | − | + | + | |
| + | − | − | + | |
| + | − | + | + | "1" |
| + | + | + | − | |
| − | + | − | − | |
| − | − | − | + | |
| + | + | + | + | "2" |
| − | + | + | − | |
| − | − | − | − | |
| + | − | − | + | |
| + | + | − | + | "3" |
| − | + | − | − | |
| − | − | + | − | |
| + | − | + | + | |

…

SYSTEM FOR MULTI-LEVEL DATA TRANSMISSION BY MEANS OF AN ANGLE-MODULATED CARRIER HAVING A CONSTANT AMPLITUDE

A. BACKGROUND OF THE INVENTION (1) Field of the Invention

The invention relates to a system for the transmission of n-level data signals from a transmitter to a receiver, the transmitter comprising a carrier oscillator and a modulator connected thereto for generating an angle-modulated carrier having a substantially constant amplitude and a continuous phase.

Numerous modulation methods for an efficient data transmission over telephone lines have been developed and introduced. Substantially all these modulation methods require a modulated carrier signal having amplitude variations, and make use of linear modulators and amplifiers.

However, these modulation methods are not so suitable for data transmission over radio links, because in radio communication systems a high power efficiency requires the use of components having a non-linear amplitude transfer function and the spectrum at the output of such a component, for example a class-C amplifier, will be wider than at the input if the amplitude of the signal at the input varies. Therefore, radio communication systems preferably utilize modulation methods which require a modulated carrier signal of a substantially constant amplitude (envelope), which means the use of angle modulation.

The every growing need for systems for data transmission over radio links also imposes the requirement on the modulation methods to be used therefor of an efficient use of the bandwidth of the available transmission channel, a low level of the power outside the band of this transmission channel also being necessary in view of the large differences in the signal levels of adjacent transmission channels. Even if there is used for that purpose a modulation method which requires an angle-modulated carrier signal having a continuous phase, the spectrum of this carrier signal will nevertheless nearly always be wider than that of the equivalent base band signal. Limiting this spectrum by means of a channel filter is an unattractive technique for radio communication systems, as the practical realisation of such a filter with an accurately prescribed amplitude and phase characteristic and, usually a very small relative bandwidth in the radio frequency range is particularly difficult and, in addition, many systems are of the multi-channel type in which the transmitted carrier frequency must be capable of assuming a great number of different values. Therefore, it is necessary to effect in radio communication systems a possible limitation of the spectrum of the angle-modulated carrier signal by means of premodulation techniques.

A further requirement for the modulation methods to be used in radio communication systems is that the receiver must also be capable of a reliable detection of the data signals, whether or not unknown frequency shifts between transmitter and receiver occur. In addition, the detection methods used in the receiver must result in an error probability as a function of the signal-to-noise ratio which degrades as little as possible with respect to the error probability for an optimum baseband transmission of the data signals. To satisfy this requirement to the highest possible extent it must be possible to use coherent demodulation in the receiver and—in view of the required efficient use of power and bandwidth—the carrier and clock signal references required in the receiver must be capable of being recovered from the transmitted modulated carrier signal itself.

(2) Description of the Prior Art

For the transmission of data signals large-scale use is made at present of a modulation method which is known as PSK (Phase-Shift-Keying) and which is described in detail in chapter 10 of Reference D(1) and in chapter 9 of Reference D(2). If the PSK-method is used in its basic form, it results in a modulated carrier signal of a constant amplitude and the data signals can be detected in an optimum manner by means of orthogonal coherent demodulation, it being possible to recover the carrier and clock signal references required therefor from the transmitted PSK signal itself.

Thus, this PSK-method has many properties which are desirable for efficient data transmission over radio links. The power density spectrum of the PSK signal is, however, relatively wide and the level of the spectral side lobes decreases only slowly for an increasing frequency spacing from the carrier frequency, so that interferences having an impermissibly high level can be produced in adjacent radio transmission channels.

The techniques for limiting this PSK spectrum, which have already been used for a long time for efficient data transmission over telephone lines (see, for example, reference D(3)) are unattractive for radio communication systems, because they result in a modulated carrier signal having amplitude variations and, in addition, use channel filters in many cases. In view of the many desirable properties of the PSK method, much attention has been paid these last few years to premodulation techniques for reducing the spectral side lobes without sacrificing the desired properties. In these premodulation techniques the pulse shape for the modulating data symbols is chosen so that the modulated constant-amplitude carrier signal in the centre of each symbol interval has the same nominal phase as when the PSK method is used, and the transitions between consecutive nominal phases are made as gradual as possible. Reference D(4) comprises a good survey of pulse shapes already proposed and the reduction of spectral side lobes achieved therewith. Reference D(5) describes a method for determining the error probability as a function of the signal-to-noise ratio in these cases.

B. SUMMARY OF THE INVENTION

It is an object of the invention to provide, in a system of the type referred to, a new concept of a transmitter for reducing the spectrum of angle modulatd signals by means of premodulation techniques, which transmitter can cooperate with a prior art receiver and which, in a practical embodiment, results in a transmitted modulated carrier signal of a substantially constant amplitude which has both a narrower spectral main lobe and, for frequencies outside this spectral main lobe, considerably less power than is found with known PSK signals.

The system according to the invention is characterized in that the n-level data signals are converted into intermediate k-level signals having more levels than the n-level data signals ($k>n$), at least one of the n-level data signals having associated therewith two symbols of the intermediate k-level signal and that the k-levels of the intermediate multi-level signal correspond with the phase variations of the carrier signal in one symbol interval of the sequence ranging from $-(k-1)\pi/n$ to $+(k-1)\pi/n$ in increments of $2\pi/n$ in a one-to-one relationship and that the receiver is formed by a differential n-phase receiver which is arranged for detecting in each symbol interval one out of n different phase variations in multiples of $2\pi/n$.

C. SHORT DESCRIPTION OF THE DRAWINGS

Embodiments of the invention and their advantages will now be further explained with reference to the drawings, in which:

FIG. 1 shows a block diagram of a known data transmission system with phase modulation, FIG. 2 shows a block diagram of a known modulation stage, FIG. 3 shows the pulse shape of a data symbol, FIG. 4 shows a phase diagram, FIG. 5a–5g show time diagrams, FIG. 6 shows the power spectrum of a modulated signal, FIG. 7 shows a block diagram of a modulation stage in accordance with the invention, FIG. 8a–8d show time diagrams, FIG. 9 shows the power spectrum of a modulated signal.

Figure 5:
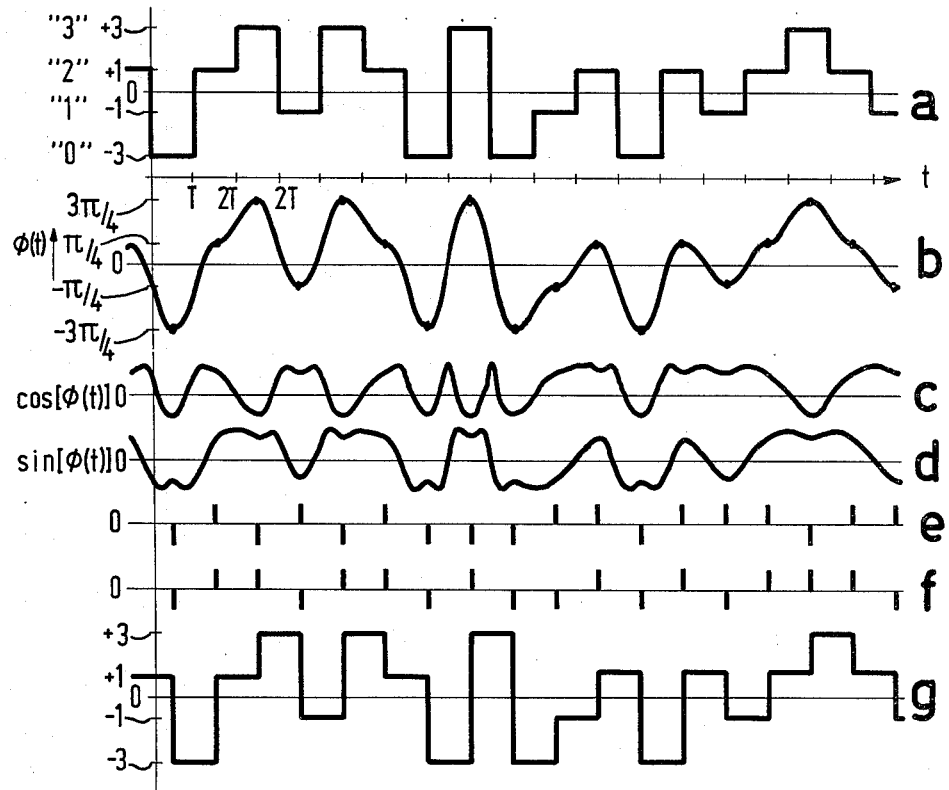

D. REFERENCES (1) W. R. Benett, J. R. Davey, "Data Transmission", New York: McGraw-Hill, 1965.

(2) R. W. Lucky, J. Saltz, E. J. Weldon Jr., "Principles of Data Communication", New York: McGraw-Hill, 1968.

(3) P. A. Baker ("Phase-Modulation Transmitter"), U.S. Pat. No. 3,128,342, Apr. 7, 1964.

(4) L. J. Greenstein, "Spectra of PSK Signals with Overlapping Baseband Pulses", IEEE Trans. Commun., Vol. COM25, No. 5, pp. 523–530, May 1977.

(5) V. K. Prabhu, "PSK-Type Modulation with Overlapping Baseband pulses", IEEE Trans. Commun. Vol. Com-25, No. 9, pp. 980–990, September 1977.

(6) J. P. Costas, "Synchronous Communications", Proc. IRE, Vol. 44, No. 12, pp. 1713–1718, December 1956.

(7) W. C. Lindsey, M. K. Simon, "Carrier Synchronisation and Detection of Polyphase Signals", IEEE Trans. Commun. Vol. COM-20, No. 3, pp. 441–454, June 1972.

(8) F. D. Tisi et al. ("Receiver for the Reception of Information Pulse Signals Located in a Prescribed Transmission Band"), U.S. Pat. No. 3,590,386, June 29, 1971.

(9) S. Pasupathy, "Nyquist's Third Criterion", Proc. IEEE, Vol. 62, No. 6, pp. 860–861, June 1974.

E. DESCRIPTION OF THE EMBODIMENTS

General description

FIG. 1 shows a general block diagram of a system for transmission of multi-level data signals from a transmitter 1 to receiver 2. Transmitter 1 comprises a data signal source 3 which is synchronized by a clock signal source 4. The multi-level data signals derived from source 3 and having a symbol frequency 1/T are applied to a modulation stage 5 having a carrier oscillator 6 for generating an angle-modulated carrier signal having a substantially constant amplitude and a continuous phase. This modulated signal is applied to the transmission channel via an output circuit 7, wherein, as necessary, power amplification and translation to a desired radio frequency band are effected.

In receiver 2 this modulated signal is derived from the transmission channel via an input circuit 8, wherein as necessary, amplification and translation to the original frequency band is effected. The received modulated signal is applied to an orthogonal demodulation stage 9, comprising two product demodulators 10, 11 and two low-pass filters 12, 13, connected respectively thereto. These demodulators 10, 11 are fed by two reference carriers having a phase difference of $\pi/2$ rad. Two demodulated signals, which are applied to a regeneration circuit 14 having two sampling circuits 15, 16 controlled by a reference clock signal, then appear at the output of low-pass filters 12 and 13, respectively. The samples of these two demodulated signals, thus obtained, are applied to a signal processing circuit 17 to obtain the original multi-level data signals, which are passed on to a data signal sink 18. In addition, receiver 2 comprises a carrier circuit 19 and a clock circuit 20 to recover the required carrier and clock signal references from the transmitted modulated signal itself.

The structure of carrier circuit 19, which is connected directly to input circuit 8 is predominantly determined by the detection method used in the demodulation stage 9. In the case of differential detection the two reference carriers for each symbol interval are derived from the transmitted modulated signal in the preceding symbol interval; carrier circuit 19 can then be constructed in the manner described in Reference D(1), paragraph 10.3 and Reference D(2), paragraph 9.2.3. In the case of coherent detection the two reference carriers are derived from a local carrier generator whose phase is lcked onto the (non-modulated) carrier associated with the transmitted modulated signal. To implement carrier circuit 19, use can then be made of several standard techniques such as the Costas loop, see Reference D(6), or the $N^{th}$ power (multiply-and-divide)-loop, see Reference D(7), paragraph IIIA. It is assumed here that coherent detection is used in demodulation stage 9 and that carrier circuit 19 is constructed as a Costas loop. The problem of ambiguity in the phase of the reference carriers thus obtained can then be solved in known manner by coding the data signals in terms of level transitions or by organising the data signals in blocks of symbols and by adding additional symbols, which comprise information with respect to the proper carrier phase, to the blocks.

It is here further assumed that a reference clock signal having a symbol frequency 1/T is derived from the demodulated signals, clock circuit 20 being connected to the two outputs of demodulation stage 9 for this purpose. This clock circuit 20 can also be constructed in several known manners; Reference D(8) comprises a construction of clock circuit 20 suitable for the present use.

When the system shown in FIG. 1 is arranged in a PSK system in accordance with Reference D(4) and D(5), modulation stage 5 in transmitter 1 can be constructed in accordance with the functional block diagram of FIG. 2. This modulation stage 5 comprises a linear phase modulator 21, which is fed by carrier oscillator 6 having a constant frequency equal to the desired carrier frequency $f_c$, the data signals of source 3 being applied to this phase modulator 21 via a filter 22 having a prescribed impulse response h(t) of a limited duration. FIG. 3 shows an example of the pulse shape of the modulating data symbols proposed in the above-mentioned references, the example corresponding to an impulse response h(t) having a duration 2T and a Racos-shape (Racos="Raised Cosine") given by $$h(t) = \begin{cases} \cos^2(\pi t/2T), & |t/K| < 1 \\ 0, & |t/K| \geq 1 \end{cases} \quad (1)$$

(cf. Reference D(4), table II).

The operation of this modulation stage 5 will now be explained for the case that a 4-level antipodal data signal occurs at the output of source 3 in the form of rectangular voltage pulses having a pulse width T and a pulse height 1 or 3. In this case the filter 22 has an impulse response h(t) in accordance with formula (1) and phase modulator 21 has a gain factor of $\pi/4$ rad. per unit of amplitude. At the output of phase modulator 21 a PSK signal appears having a constant amplitude which can be expressed as:

$$\sin[(w_c t + \phi(t)] \quad (2)$$

wherein $w_c = 2\pi f_c$, $f_c$ being the carrier frequency. For this PSK signal the path of the signal vector $$\vec{v} = \exp[(j\phi(t)] \quad (3)$$

with $w_c t$ as reference, is shown in the polar diagram of FIG. 4 by a solid arc. The signal positions which are possible for this vector $\vec{v}$ in the centre of the symbol intervals are denoted by points which correspond to the levels $-3, -1, +1, +3$, of the 4-level data signal obtained from the output of source 3.

The operation of this PSK system will be illustrated with reference to the time diagram of FIG. 5.

Time diagram a shows the 4-level data signal of source 3 to be transmitted, wherein the quaternary values "0", "1", "2" and "3" as well as the voltage values $-3, -1, +1$ and $+3$, corresponding therewith are shown. Applying this data signal a to modulation stage 5 results in a PSK signal (defined by formula 2), the phase $\phi(t)$ of which is shown in time diagram b for the case $\phi(0) = -\pi/4$ rad.

In demodulation stage 9 this PSK signal is multiplied by the two reference carriers, namely by sin ($w_c t$) in demodulator 10 and by cos ($w_c t$) in demodulator 11. At the output of the demodulators 10 and 11 appear the low-frequency components cos [$\phi(t)$] and sin [$\phi(t)$], respectively, which are shown in time diagrams c and d. In regeneration circuit 14 the filtered low-frequency components cos [$\phi(t)$] and sin [$\phi(t)$] are sampled by the reference clock signal, the sampling pulses occurring at instants $t = mT + T/2$, and m being an integer. The low-pass filters, 12, 13 can be optimized in a conventional manner (cf. reference D(5), page 981). The sequence of signal samples shown in time diagrams e and f appear at the output of sampling circuits 15, 16 respectively. Signal processing circuit 17 is arranged so that the polarity of its output value is equal to that of the signal sample at the output of circuit 16 and that the magnitude of its output value is equal to 1 for a positive polarity of the signal sample at the output of circuit 15 and equal to 3 for a negative polarity of the last-mentioned signal sample. The result is a regenerated 4-level data signal, which is shown in time diagram g and which—neglecting a constant delay for T/2—corresponds to the 4-level data signal to be transmitted in time diagram a.

Figure 6:
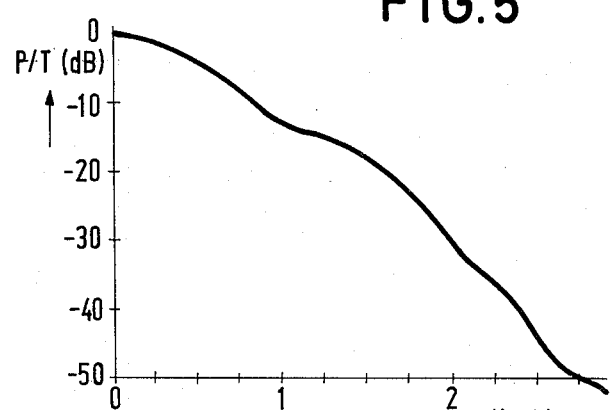

The described PSK system has many properties which are desirable for satisfying the above-mentioned requirements for efficient data transmission over radio links. However the spectrum of this PSK signal at the output of modulation stage 5 is still rather wide, as appears from FIG. 6, wherein the normalised spectral power density p/T as a function of the normalised frequency $|(f - f_c) T|$ is shown for the PSK signal defined by formula 2) having a pulse shape as shown in FIG. 3 in the case of 4-level data signals (cf. Reference D(4) FIG. 2(b) on page 528). FIG. 6 shows that the level of the spectral power density for frequencies f, which are about twice the symbol frequency 1/T removed from the carrier frequency $f_c$ is about 30 dB below the level for the carrier frequency $f_c$ itself. For a channel spacing of 25 kHz which is customary for radio communication systems and a 4-level data signal having a symbol frequency of 8 kHz this implies that the PSK signal in the two adjacent transmission channels will cause interferences having, in view of the large differences in signal level, an impermissibly high level.

The prior art PSK system described above furnishes an angle-modulated carrier having a constant envelope, the phase of which can assume in the centre of the symbol intervals one of the four possible values $-3\pi/4$, $-\pi/4$, $+\pi/4$, $+3\pi/4$. Such a carrier can be amplified in non-linear transmitter output stages (class-C) without the spectrum being increased.

However, the spectrum of this signal is still rather wide. In an embodiment of the PSK system according to the invention using differential phase modulation, a fifth possible phase change $-\pi$ is added to the four possible phase changes $-\pi/2$, 0, $+\pi/2$, $+\pi$. By having the choice between the phase changes $+\pi$ and $-\pi$, which are modulo-$2\pi$ equal, be determined by the phase variation in preceding symbol intervals, such a phase variation can be obtained that the spectrum is made narrower. This is based on the recognition that less power is generated outside the main lobe of the spectrum using a slight curvature of the phase variation (second tone derivative of the phase).

These measures will now be further explained with reference to the 4-level data signal already considered, wherein a data symbol in time interval [mT, (m+1)T], where m is an integer, is represented by a(m) and the level of a(m) is indicated by the corresponding quaternary value "0", "1", "2" or "".

The explanation is given for the case in which the phase $\phi$ (t) between the instants $t = mT$ and $t = (m+1)T$ changes by an amount $\Delta\phi(m)$ given by:

$$\Delta\phi(m) = -(k-1)\pi/n, \ldots, 0, \ldots +(k-)\pi/n$$

(increment: $2\pi/n$), wherein n is equal to the number of levels of the data symbols and wherein, in the first example, k=5.

For this case (n=4) it is further assumed that the relation between the phase change $\Delta\phi(m)$ and the data symbols depends on the level of a(m) in accordance with the following Table 1.

TABLE 1

| a(m) | k(m) | $\Delta\phi(m)$ |
|---|---|---|
| "0" | −2, +2 | −$\pi$, +$\pi$ |
| "1" | −1 | −$\pi/2$ |
| "2" | 0 | 0 |
| "3" | +1 | +$\pi/2$ |

For the level a(m)="0", to which the maximum absolute phase change of $\pi$rad. is alloted, the value of $\Delta\phi(m)$ is determined by the preceding values $\Delta\phi(m-1)$ and $\Delta\phi(m-2)$—and therefore the values k(m−1) and k(m−2)—in accordance with the rules of the following Table 2.

TABLE 2

| a(m) = "0" | k(m) | $\Delta\phi(m)$ |
|---|---|---|
| k(m−1) − k(m−2) > 0 | +2 | +$\pi$ |
| k(m−1) − k(m−2) = 0, k(m−1) > 0 | +2 | +$\pi$ |
| k(m−1) − k(m−2) = 0, k(m−1) < 0 | −2 | −$\pi$ |
| k(m−1) − k(m−2) < 0 | −2 | −$\pi$ |
| k(m−1) = 0, k(m−2) = 0 | +2 | +$\pi$ |

If a(m)="0" and k(m−1)=k(m−2)=0, the value of $\Delta\phi(m)$ could be determined by still earlier values k(m−3), k(m−4), .... As it appears that such an extension furnishes few advantages, a fixed choice in accordance with the last line of the above Table 2 from the possible values −2 and +2 for k(m) is made.

Figure 7:
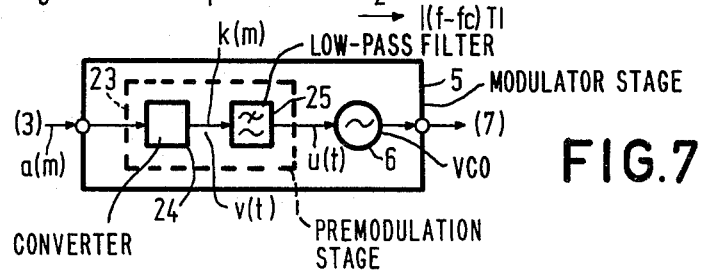

The modulation stage 5 for generating an angle-modulated carrier signal having a phase $\phi(t)$ in accordance with the above rules can be effected in several ways. In FIG. 7 it is assumed that modulation stage 5 is constructed as a frequency modulation stage having an ideal voltage-controlled oscillator (VCO) 6, the rest frequency $f_o$ of which is always equal to the desired carrier frequency $f_o$ and the gain constant $K_o$ of which is equal to $\pi/2$ rad. per amplitude unit per symbol interval T. The 4-level data signal of source 3 in FIG. 1 is applied to oscillator 6 via a premodulation circuit 23 comprising the cascade arrangement of a level converter 24 for converting the 4-level data signal into a 5-level data signal and a low-pass filter 25 having a response which satisfies the third Nyquist criterion. This level converter 24 is arranged so that the incoming 4-level data symbols a(m) are converted into intermediate data symbols k(m) having 5 levels, the relationship of which to the 4 levels of a(m) is given in the Tables 1 and 2.

The operation of modulation stage 5 shown in FIG. 7 will now be explained for the case in which the data symbols k(m) at the output of converter 24 appear in the form of rectangular voltage pulses having a pulse width T and a polarity and a pulse height which correspond to the values k(m).

In addition, it is assumed that low-pass filter 25 has the narrowest possible bandwidth (cf. Reference D(1), pages 65), so that in view of the rectangular pulse shape chosen here filter 25 has during a period of time T of the data symbols a transfer function H(w) which is given by:

$$H(w) = \begin{cases} \dfrac{(wT/2)^2}{\sin^2(wT/2)} & , w \leq \pi/T \\ 0 & , w > \pi/T \end{cases} \quad (4)$$

The explanation will be given with reference to the time diagrams in FIG. 8.

Figure 8:
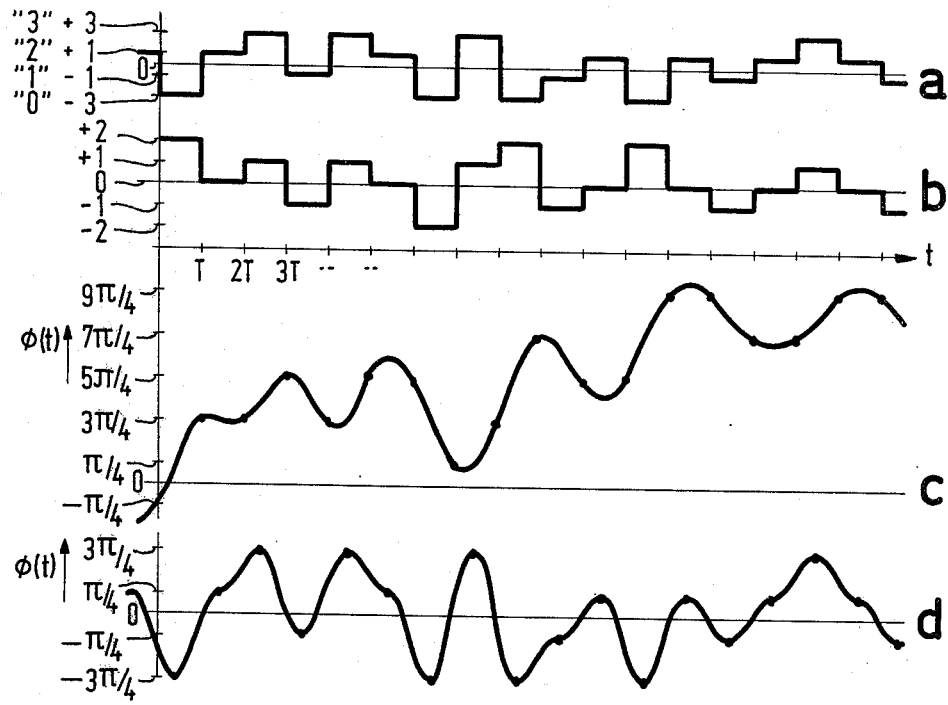

Time diagram a of FIG. 8 shows the same 4-level data signal of source 3 in FIG. 1 to be transmitted as the time diagram a of FIG. 5. In response to data signal a an, intermediate 5-level data signal, which is shown in time diagram b, occurs at the output of level converter 24. Applying this 5-level data signal b to the voltage-controlled oscillator 6 in FIG. 7 via filter 25 results in an angle-modulated carrier signal of a constant amplitude which can be expressed in the form:

$$[\sin w_c t + \phi(t)] \quad (5)$$

Time diagram c of FIG. 8 shows the phase $\phi(t)$ of this signal in response to the 5-level data signal b for the case where $\phi(0) = -\pi/4$ rad. For comparison, time diagram d in FIG. 8 shows the phase $\phi(t)$ of the modulated signal at the output of modulation stage 5 in FIG. 2 on application of data signal a, or in other words, the phase $\phi(t)$ when using the PSK method already described (see time diagram b in FIG. 5).

From time diagram c in FIG. 8 it is seen that the phase $\phi(t)$ between the instants t=mT and t=(m+1)T changes by an amount $\Delta\phi(m)$ equal to $\pm\pi$, $\pm\pi/2$ or 0 rad. The phase $\phi(t)$ at the output of the voltage-controlled oscillator 6 is proportional to the integral of its input voltage u(t), so that it applies that $$\Delta\phi(m) = \phi((m+1)T) - \phi(mT) = K_o \int_{mT}^{(m+1)T} u(t)\,dt \quad (6)$$

wherein, as mentioned above, $K_o = \pi/(2T)$

Furthermore, filter 25 satisfies the third Nyquist criterion, so that it holds that $$\Delta\phi(m) = K_o \int_{mT}^{(m+1)T} u(t)dt = K_o \int_{mT}^{(m+1)T} v(t)dt \quad (8)$$

wherein v(t) is the output voltage of level converter 24 which, for the time interval [(mT, (m+1)T] is equal to the constant value k(m). On the basis of these formulae it holds for the phase change $\Delta\phi(m)$ that $$\Delta\phi(m) = K_o k(m)T = k(m)\pi/2 \quad (9)$$

The form of the phase $\phi(t)$ for instants t within the relevant time interval [mT, (m+1)T] depends on the specific choice of filter 25, which satisfies the third Nyquist criterion. Even for the choice made here for the narrowest possible bandwidth for filter 25, the pulse response h(t) appears to have its most significant values in a central interval of the length eT, so that the form of the phase $\phi(t)$ within the time intervals [mT, (m+1)T] is predominantly determined by the filtered version of the data symbols k(m) and, to a lesser extent, by the filtered version of the data symbols k(m−1) and k(m+1).

The above-described measures in modulation stage 5 of FIG. 7 imply that for the data symbol a(m) having a level "0", to which the phase variations Δφ(m)=±π rad. have been alloted, the level k(m) at the output of converter 24 is always chosen so that the direction of the change in level in the preceding symbol intervals is maintained, as is also shown by the time diagrams a and b in FIG. 8. This prevents a phase variation of π rad. in one direction being immediately followed by a phase variation of π rad. in the other direction. This results in a phase φ(t) of the modulated signal being used which varies more gradually than in the known PSK method, as will be apparent when time diagrams c and d in FIG. 8 are compared.

Figure 9:
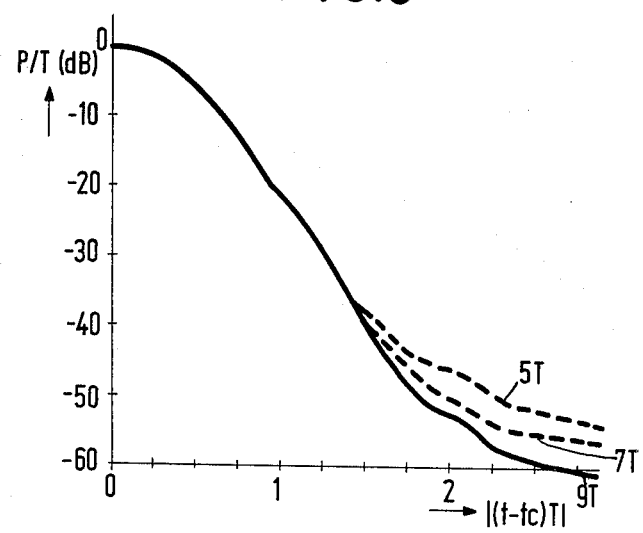

Due to this more gradual character of its phase variations, the present modulated carrier signal has a frequency spectrum which has a narrower main lobe as well as considerably less power for frequencies outside this main lobe, than the frequency spectrum of the known PSK signal (cf. FIG. 6). This also appears from FIG. 9 wherein for the present case the normalised spectral power density P/T as a function of the normalised frequency $|(f-f_c)T|$ is shown. Particularly, FIG. 9 shows that for frequencies f which are about twice the symbol frequency 1/T removed from the carrier frequency $f_c$ the level of the spectral power density relative to that for the carrier frequency $f_c$ is approximately 60 dB lower. In contrast therewith this level is only approximately 30 dB lower for the same frequencies when the known PSK modulation stage of FIG. 2 is used, than the level for the carrier frequency $f_c$, as shown by FIG. 6. The use of these measures therefore implies that for radio communication systems having the above-mentioned channel spacing of 25 kHz and 4-level data signals having a symbol frequency of 8 kHz, the interferences in the two adjacent transmission channels have a level which is sufficiently low for the major part of the practical applications in the radio frequency range.

This remarkable reduction of the power outside the band of the spectral main lobe is obtained by means of a modulation stage 5, which, as shown in FIG. 7 comprises a level converter 24 and a low-pass filter 25. Although level converter 24 can be constructed in many different manners, an implementation in digital techniques has many practical advantages.

Figure 10:
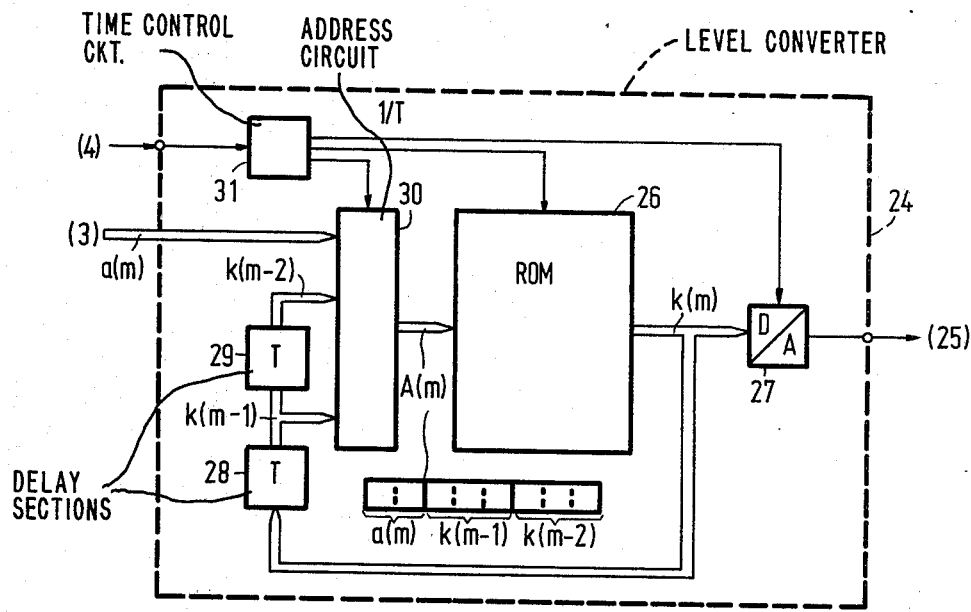
FIG. 10 shows a block diagram of a firt level converter for use in a system according to the invention.

FIG. 10 shows by way of example a digital level converter 24 of a simple construction. This simple construction has been obtained by making use of a digital store 26 in the form of a ROM (ROM="Read Only Memory"), wherein 3-bit words which represent the 5 possible values −2, −1, 0, +1, +2 of k(m) have been stored in the storage locations, these 3-bit words being read at the symbol frequency 1/T and converted by means of a digital-to-analog converter 27 into the corresponding voltage values of the 5-level data symbols k(m). In this case the 4-level data symbols a(m) of source 3 in FIG. 1 are applied to level converter 24 in the form of 2-bit words which represent the 4 possible level "0", "1", "2", "3" of a(m). As explained hereinbefore, the value k(m) depends on the data symbol a(m) as well as on the two preceding values k(m−1) and k(m−2). This means that the address A(m) for the storage location of the 3-bit word k(m) in store 26 must be assembled from the 2-bit word a(m) and the two 3-bit words k(m−1), k(m−2) which are obtained by applying the 3-bit words read from store 26 to two delay sections 28, 29, each having a time delay equal to a symbol interval T. Thus this address A(m) is an 8-bit word which is assembled by means of an address circuit 30 from the words a(m), k(m−1) and k(m−2) in the manner shown in FIG. 10: The first two bits represent data symbol a(m), the next three bits the values k(m−1) and the last three bits the value k(m−2). The control signals having frequency 1/T for addressing circuit 30, store 26 and digital-to-analog converter 27 originate from a time control circuit 31, which is synchronized with clock signal source 4 in FIG. 1. From the above Tables 1 and 2 it can be derived in a simple manner which 3-bit words must be stored in the storage locations. From the Table 1 it follows that a 3-bit word which is representative of the value k(m)=−1 is stored in all locations having an address a(m), the first two bits representing the level a(m)="1" and a 3-bit word which is representative of the value k(m)=0 and the value k(m)=+1, respectively, being stored in all locations having an address A(m), the first two bits of which represent the level a(m)="2" and the level a(m)="3", respectively. A 3-bit word which is representative of the value k(m)=−2 or the value k(m)=+2, depending on the remaining six bits of address A(m), is stored in the location having an address A(m), the first two bits of which represent the level a(m)="0". The rules in Table 2 then indicate which of these values, +2 or −2, must be chosen. So there follows for, for example an address A(m), where a(m)="0", k(m−1)=0, k(m−2)=−1 from the first line of this Table 2 the value k(m)=+2 and for an address A(m), where a(m)="0", k(m−1)=+1, k(m−2)=+2, from the fourth line of this table, the value k(m)=−2.

Implementing low-pass filter 25 in FIG. 7 as a digital transversal filter has practical advantages. The 5-level data symbols k(m) of level converter 24 in FIG. 7 are then supplied in the form of signal samples, having the value k(m), to this digital transversal filter. In view of the Dirac-pulse shape of the data symbols k(m) this digital transversal filter must have a transfer function H'(w) which is given by:

$$H'(w) = T \frac{\sin(w\,T/2)}{(w\,T/2)} \cdot H(w) \qquad (10)$$

H(w) being defined by formula (4). The impulse response h'(t) associated with H'(w) is then equal to the response h(t) at a single pulse having a width T and a height 1 of a filter having the transfer function H(w). Since a transversal filter has a pulse response of finite duration and the impulse response h'(t)=h(t) is infinitely long, a certain limitation of the duration of the impulse response must be accepted. It appears, however, that this impulse response h'(t)=h(t) has its most significant values in a central interval of the length 3T and that its values outside a centre interval of the length 7T deviate only little from the value zero. If now the duration of the impulse response of the digital transversal filter is limited to the centre interval of the impulse response h'(t)=h(t), which has a length of 5T and 7T, respectively, then the transfer function of this transversal filter forms a good and a very good approximation, respectively, of H'(w) in accordance with formula (10). A simple low-pass filter is connected to the output of the digital transversalfilter in order to suppress unwanted signals at the output sampling frequency and multiples thereof. The influence of these limitations of the pulse response duration on the frequency spectrum at the output of modulation stage 5 of FIG. 7 are shown in FIG. 9 by dotted curves with the durations 5T and 7T as parameters. The deviations from these dotted curves with respect to the solid curves for an impulse response h'(t)=h(t) of unlimited duration, do not have a real significance until frequencies for which |(f−f$_c$)T| exceeds 2, but also then the interferences in the two adjacent transmission channels, which are caused by the power outside the band of the spectral main lobe have a level which is acceptable for the majority of the practical uses in radio communication systems.

So far it has been assumed that low-pass filter 25 in FIG. 7 has the narrowest possible bandwidth, but this filter may also have a larger bandwidth. From Reference D(9) it is known that a transfer function having an impulse response which satisfies the third Nyquist criterion can be converted into a transfer function $N_1(w)$ having an impulse response which satisfies the first Nyquist criterion. On the basis of this known result and the rectangular pulse form chosen here with a duration T of the data symbols, the transfer function H(w) of filter 25 can be described in a more general form as:

$$H(w) = \frac{(w\ T/2)^2}{\sin^2(w\ T/2)} \cdot N_1(w) \tag{11}$$

An impression of the influence of the bandwidth can be obtained by applying the class of Racos characteristics (Racos="Raised Cosine") for $N_1(w)$, see Reference D(2), pages 50–51. A Racos characteristic consists of a portion having a constant amplitude and a portion having a sinusoidal decreasing amplitude and can be defined by a parameter α which indicates for how much the width of the frequency band exceeds the minimum Nyquist width π/T. In the case that α=0, H(w) defined by formula (11) is equal to H(w) defined by formula (4) and filter 25 has the narrowest possible width. From Reference D(2), pages 50–51 it is known that $N_1(w)$ for a Racos-characteristic can be written as:

$$N_1(w) = \begin{cases} 1 & ,0 \leq w < (1-\alpha)\pi/T \\ 0.5*(1-\sin((wT-\pi)/2\alpha), (1-\alpha)\pi/T \leq w \leq (1+\alpha)\pi/T \\ 0 & ,w > (1+\alpha)\pi/T \end{cases} \tag{12}$$

The influence of the width of the frequency band of H(w), defined by formula (11) on the spectrum at the output of modulation stage 5 in FIG. 7 can then be checked by varying the parameter α of $N_1(w)$ in accordance with formula (12). In general it appears that lower values of the parameter α furnish an improved reduction of the power outside the band of the spectral main lobe. If now the duration of the impulse response of filter 25 is limited to a centre interval of the length 5T and the parameter α is varied, then it appears that the spectral power density does not deviate for any worthwhile extent from that for α=0, which is shown by means of the dotted curve in FIG. 9, if α is smaller than 0.25. This makes the requirements for H(w) less severe and simplifies the practical construction of filter 25 as a digital transversal filter having a transfer function H'(w) in accordance with formula (10).

In modulation stage 5 of FIG. 7 premodulation circuit 23 can now be fully realised in digital techniques by combining the above-mentioned digital construction of low-pass filter 25 with that of level converter 24 of FIG. 10, it then being possible to omit the digital-to-analog converter 27 at the output of level converter 24 in FIG. 10 and the analog-to-digital converter at the input of the digital transversal filter, because the 3-bit words k(m) read from store 26 in FIG. 10 can be directly processed in such a digital filter.

The modulated carrier signal at the output of modulation stage 5 in FIG. 7 can be processed in the receiver 2 of FIG. 1.

Figure 11:
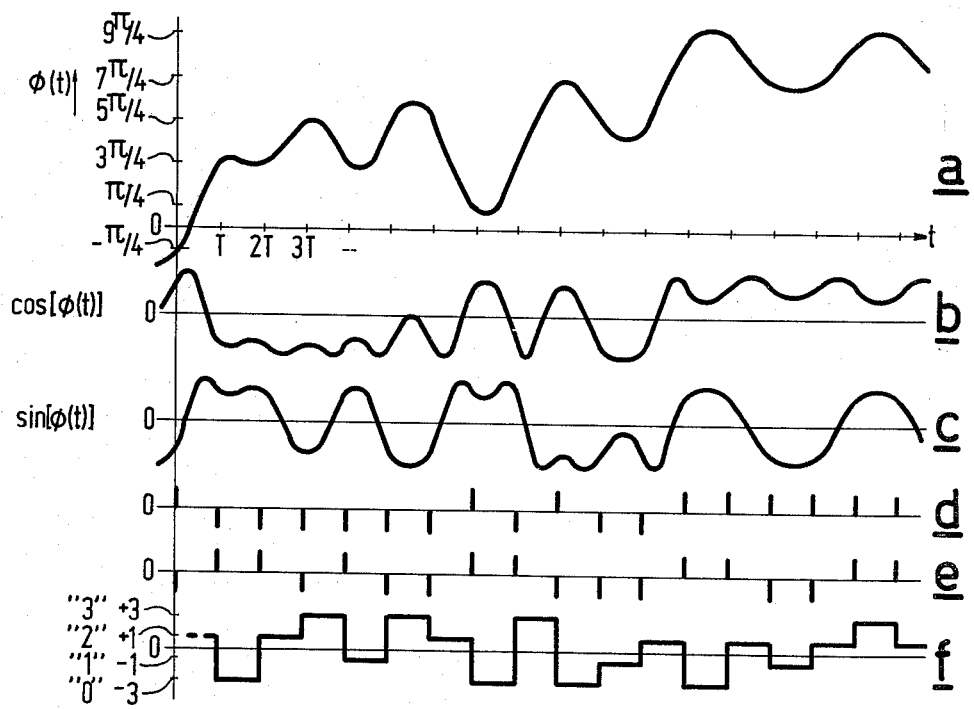
FIGS. 11a–11f show time diagrams.

The operation of this receiver 2 will be explained with reference to the time diagram in FIG. 11. Herein it is assumed that at the input of receiver 2 an angle-modulated carrier signal defined by formula (5) appears with a phase φ(t) in accordance with time diagram c in FIG. 8, which phase φ(t) is again shown in time diagram a in FIG. 11. Multiplying this signal by reference carrier sin (w$_c$t) in demodulator 10 and by reference carrier cos (w$_c$t) in demodulator 11 then results in the low-frequency components cos [φ(t)] and sin [φ(t)] which are shown in time diagrams b and c of FIG. 11, respectively. Time diagrams d and e of FIG. 11 show the sequences of signal samples at the output of the sampling circuits 15 and 16, respectively, when the sampling pulses occur at instants t=mT. Finally, time diagram f shows the regenerated 4-level data signal at the output of signal processing circuit 17 which, not considering a constant delay for a symbol interval, corresponds to the 4-level data signal to be transmitted, as shown in time diagram a of FIG. 8.

Time diagram a in FIG. 11 shows that when φ(0)=−π/4 the phase φ(t) at the instants t=mT is always equal to ±π/4 rad. or odd multiples thereof. For the phase variation Δφ(m) in a symbol interval [mT, (m+1)T] it then holds that the polarities of the signal samples d and e at instant t=(m+1)T at the end of this interval are sufficient to determine the value modulo −2π of the phase φ((m+1)T) and likewise the polarities of the signal samples d and e at instant t=mT at the beginning of the interval are sufficient to determine the value modulo 2π of the phase φ(mT). The combination of the polarities of the signal samples d and e at instants t=mT and t=(m+1) T are sufficient to determine whether the phase variation Δφ(m) is equal to −π/2 rad., 0 rad., +π/2 rad. or ±πrad. On the basis of the above-described relationship between the phase variation Δφ(m) and the data symbols a(m), the level of the transmitted data symbol a(m) can then be unambiguously determined by the said combinations of polarities of the signal samples d and e. The fact that no distinction is made between Δφ(m)=−πrad. and Δφ(m)=+πrad. furnishes no difficulties: both values Δφ(m) correspond to the same level "0" of the data symbol a(m). As the phase φ(t) can assume four different values at instants t=mT, four different combinations of the polarities of the signal samples d and e at the instants t=mT and t=(m+1)T are possible for each level of the data symbols a(m). The Table in FIG. 12 shows these combinations and the corresponding levels of a(m).

Figures 12, 13:
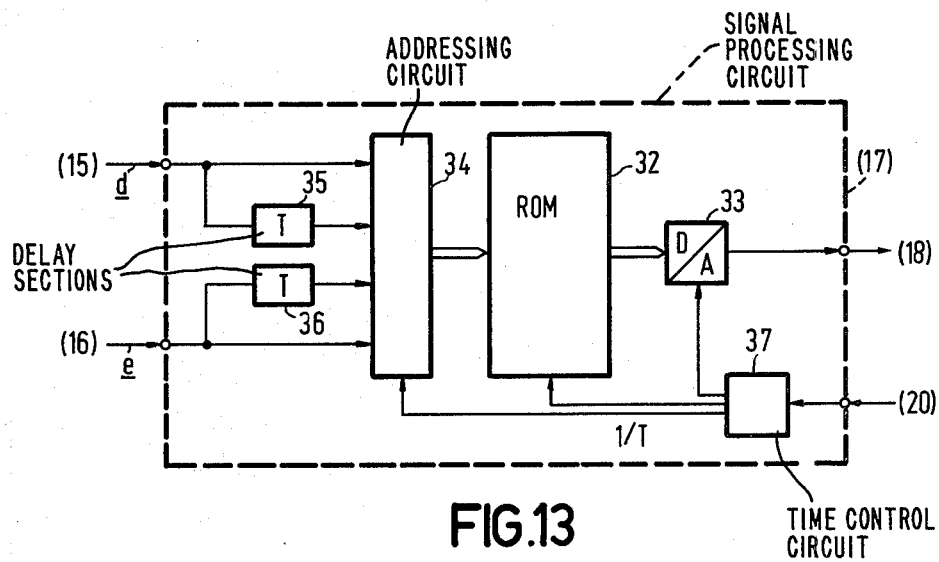
FIG. 12 shows a memory table for the level converter of FIG. 10.
FIG. 13 shows a block diagram of a differential phase receiver.

FIG. 13 shows a signal processing circuit 17 having a simple construction which is based on the above-mentioned considerations. This simple construction has been obtained by using a digital store 32 in the form of a ROM, wherein two-bit words, representing possible levels "0", "1", "2" and "3" of data signal a(m) are stored in the storage locations, these 2-bit words being read at the symbol rate 1/T and being converted into the corresponding voltage values of the data symbols a(m) by means of a digital-to-analog converter 33. The address for the storage locations of the 2-bit word a(m) is assembled by means of an addressing circuit 34 from the combination of the polarities of the signal samples d and e at the instants t=(m+1)T and t=mT, these last-mentioned polarities being available at the instants t=(m+1)T at the output of delay sections 35, 36, which are connected to the sampling circuits 15, 16 and each have a time delay equal to the symbol interval T. It then follows from the Table of FIG. 12 which 2-bit words must be stored in the storage locations. The control signals, having frequency 1/T, for addressing circuit 34, store 32 and digital-to-analog converter 33 are obtained from a time control circuit 37 which is connected to clock circuit 20 in FIG. 1.

When low-pass filters 12, 13 in this receiver 2 are optimised in a conventional manner, the error probability as a function of the signal-to-noise ratio appears to be substantially equal in the present case to the error probability for the case when the known PSK modulation stage 5 of FIG. 2 is used.

The use of the level converter shown in FIG. 10 results in a data transmission system which has the same desired communication properties as the known PSK systems, but which can use the available frequency spectrum in a more efficient manner than these known PSK systems owing to the remarkable reduction of the power outside the frequency band of the spectral main lobe which, in addition, is narrower than in the described example.

A smooth variation of the phase versus the time, the second time derivative of the phase being as small as possible, is advantageous to obtain a narrow spectrum of the phase modulated signal.

Several rules can be followed for the choice of the phase variation $+\pi$ or $-\pi$ depending on the point of view, which is taken.

In accordance with a first point of view the change in the slope of the phase variation, which begins in the preceding symbol intervals must be continued. The preceding Table 2 shows the resulting rules wherein two preceding symbol intervals are taken into consideration.

Secondly, the view can be taken that the average slope of the phase variation in the preceding symbol intervals must be deviated from to the least possible extent. The rule resulting herefrom taking the three preceding symbol intervals into consideration is shown in the following Table 3.

TABLE 3

| a(m) = "0" | k(m) | Δφ(m) | |
|---|---|---|---|
| k(m−1) + k(m−2) + k(m−3) >0 | +2 | +π | |
| k(m−1) + k(m−2) + k(m−3) <0 | −2 | −π | |
| k(m−1) + k(m−2) + k(m−3) = 0 | +2 | +π | (1) |

(1) Actually there is here a free choice between +π and −π.

A third view may be that the phase must be kept constant as long as possible or, in other words, that the deviations of the phase or the value of the slopes in the phase variation must be kept as small as possible. The rule following therefrom, taking the three preceding symbol intervals into considerations, is shown in the following Table 4.

TABLE 4

| a(m) = "0" | k(m) | Δφ(m) |
|---|---|---|
| k(m−1) + k(m−1) + k(m−3) <0 | +2 | +π |
| k(m−1) + k(m−2) + k(m−3) >0 | −2 | −π |
| k(m−1) + k(m−2) + k(m−3) = 0 | +2 | +π |

In the foregoing there is for one data symbol a choice between two phase variations, for the other data symbols the phase variation is fixed. This system can now be extended by creating a choice also for other data symbols, depending on the preceding phase variation. The following Table 5 gives an example thereof.

TABLE 5

| a(m) | k(m) | Δφ(m) |
|---|---|---|
| "3" | +2, −2 | +π, −π |
| "0" | −1, +3 | −π/2, +3π/2 |
| "1" | 0 | 0 |
| "2" | +1, −3 | +π/2, −3π/2 |

As this Table shows, the four-level data signal a(m) is converted into a seven-level signal k(m) and a certain phase shift is associated with each of the seven values of k(m). It should be noted that the phase shifts associated with the data symbol "2" are equal modulo $-2\pi$. The same holds for the symbols "0" and "3", so that a conventional prior art differential phase receiver can derive the symbols a(m) in an unambiguous manner from the phase variations Δφ(m).

Affecting the phase variation can be done in accordance with the above-mentioned three views, which result in the rules laid down in the following Tables 6–8.

(1) Maintaining the slope change

TABLE 6

| a(m) | f | k(m) | Δφ(m) |
|---|---|---|---|
| 0 | >0 | −1 | −π/2 |
| 0 | <0 | +3 | +3π/2 |
| 0 | =0 | −1 | −π/2 |
| 1 | d | 0 | 0 |
| 2 | <0 | +1 | +π/2 |
| 2 | >0 | −3 | −3π/2 |
| 2 | =0 | +1 | +π |
| 3 | <0 | +2 | +π |
| 3 | >0 | −2 | −π |
| 3 | =0 | +2 | +π |

In this Table f represents f=k(m−2)−k(m−1) and d denotes that the value of f is not relevant (do not care).

(2) Maintaining the average slope

TABLE 7

| a(m) | g | k(m) | Δφ(m) |
|---|---|---|---|
| 0 | <0 | −1 | −π/2 |
| 0 | >0 | +3 | +3π/2 |
| 0 | =0 | −1 | −π/2 |
| 1 | d | 0 | 0 |
| 2 | >0 | +1 | +π/2 |
| 2 | <0 | −3 | −3π/2 |
| 2 | =0 | +1 | +π/2 |
| 3 | >0 | +2 | +π |
| 3 | <0 | −2 | −π |
| 3 | =0 | +2 | +π |

In this Table, g represents g=k(m−3)+k(m−2)+k(m−1).

(3) Keeping the phase constant

TABLE 8

| a(m) | h | k(m) | Δφ(m) |
|---|---|---|---|
| 0 | >0 | −1 | −π/2 |
| 0 | <0 | +3 | +3π/2 |
| 0 | =0 | −1 | −π/2 |
| 1 | d | 0 | 0 |
| 2 | <0 | +1 | +π/2 |
| 2 | >0 | −3 | −3π/2 |
| 2 | =0 | +1 | +π/2 |
| 3 | <0 | +2 | +π |
| 3 | >0 | −2 | −π |

TABLE 8-continued

| a(m) | h | k(m) | Δφ(m) |
|---|---|---|---|
| 3 | =0 | +2 | +π |

In this Table, h represents h=k(m−3)+k(m−2)+k(m−1).

The following Table 9 shows a seven-level code wherein two opposite phase shifts of equal values are associated with each data symbol.

TABLE 9

| a(m) | k(m) | Δφ(m) |
|---|---|---|
| "0" | +2, −2 | +π, −π |
| "1" | −1, +1 | −π/2, +π/2 |
| "2" | 0 | 0 |
| "3" | −3, +3 | −3π/2, +3π/2 |

Also for this code rules can be given which determine the choice between the two phase variations which are analogous to the rules shown in the Tables 6, 7 and 8. In these cases the spectrum of the modulated signal cannot be or can hardly be distinguished from those of the preceding cases. Thus, whereas the spectrum shows all desired properties, the receiver is somewhat more complicated. In this receiver it will be necessary to distinguish the phase variations $+\pi/2$ from $-3\pi/2$ and the phase variation $-\pi/2$ from $+3\pi/2$ for an umambiguous determination of the transmitted data symbols.

In a prior art differential phase receiver by an additional sampling in the centre of the symbol interval the phase variation from the beginning of the symbol interval can be determined. In the above-mentioned cases this phase variation amounts to $+\pi/4$ or $-3\pi/4$ and $-\pi/4$ or $+3\pi/4$, respectively, which phase variations are different on a modulo-$2\pi$ basis. By means of these additional samplings in the centre of the symbol intervals the phase variations which are the same on a modulo-$2\pi$ basis over a symbol interval can yet be distinguished.

Figure 14:
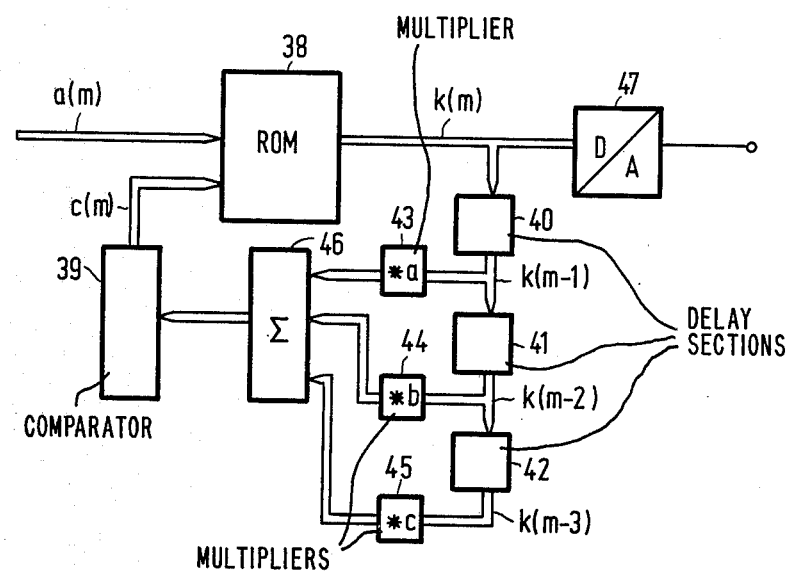
FIG. 14 shows a block diagram of a universal level converter for use in a system according to the invention.

A universal level converter for converting a four-level signal into a seven-level signal in accordance with the rules of Table 6, 7 or 8 is illustrated in FIG. 14. In accordance with which rules the conversion will take place will depend on the values of the coefficients a, b and c.

Table 6: maintaining the slope change: a=−1, b=1, c=0

Table 7: maintaining the average slope: a=−1; b=−1; c=−1

Table 8: keeping the phase constant: a=1; b=1; c=1.

The level converter comprises a ROM store 38. Applied to this store are the data symbols a(m) in the form of 2-bit words and the 2-bit words c(m), which are obtained from a comparator 39. These two 2-bit words together constitute a 4-bit address for the ROM-store. The associated value k(m) is stored at this address, for example in the form of a 3-bit word.

The values c(m) indicate whether the expressions for f, −g or h exceed zero, are smaller than zero, or are equal to zero. This information is derived as follows. The words k(m) read from the ROM store are delayed in the delay sections 40, 41 and 42 for a time delay of one symbol interval. The words stored in the sections are multiplied by the above-mentioned coefficients a, b and c in the multipliers 43, 44 and 45 and thereafter added together in adder 46. Comparator 39 detects whether the sum exceeds zero, is smaller than zero or is equal to zero.

The content of the ROM store 38 is specified in Table 10. It is the same for the three Tables 6, 7 and 8 when expression g in Table 7 is replaced by −g.

TABLE 10

| Address | | Content |
|---|---|---|
| a(m) | c(m) | k(m) |
| 0 | >0 | −1 |
| 0 | <0 | +3 |
| 0 | =0 | −1 |
| 1 | >0 | 0 |
| 1 | <0 | 0 |
| 1 | =0 | 0 |
| 2 | <0 | +1 |
| 2 | >0 | −3 |
| 2 | =0 | +1 |
| 3 | <0 | +2 |
| 3 | >0 | −2 |
| 3 | =0 | +2 |

The words k(m) read from the store are applied to D/A converter 47, which produces the analog seven-level signal at its output. When the low-pass filter (cf. FIG. 7) which follows after the level converter is constructed as a digital filter, the words k(m) can be applied directly to the filter. The D/A conversion is then effected behind the filter.

When the symbols a(m) occur randomly with the same probability then it is of no importance in which sequence these symbols occur in the Tables. For a system having a receiver and a transmitter this sequence must be decided beforehand but one sequence results in the same average spectrum of the angle-modulated signal as another sequence. For example, the sequence 3, 0, 1, 2 in Table 5 might be replaced by the sequence 1, 3, 0, 2 or any permutation thereof.

Figure 15:
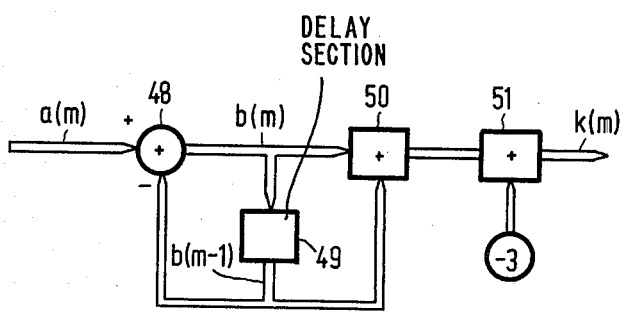
FIG. 15 shows a block diagram of a third level converter for use in a system according to the invention.

A code in accordance with the following Table 11 with a special sequence of the symbols a(m), but in all further respects the same as the code of Table 5, can be generated by the coding circuit shown in FIG. 15.

TABLE 11

| a(m) | k(m) | Δφ(m) |
|---|---|---|
| "1" | +2, −2 | +π, −π |
| "2" | −1, +3 | −π/2, +3π/2 |
| "3" | 0 | 0 |
| "0" | +1, −3 | +π/2, −3π/2 |

The four-level symbols a(m) are applied to a modulo-4 adder 48 wherein the value of the symbol b(m−1) which appears at the output of the delay section 49 is modulo-4 substracted from the value of the symbol a(m).

The symbol b(m) appearing at the output of adder 48 is applied to delay section 49 and to the linear adder 50, wherein the symbol b(m−1) is added to the symbol b(m). The output signal of adder 50 is a seven-level signal having the signal levels from 0 to 6. The linear adder 51 adds a signal having the level −3 to the output signal of adder 50. The result is a seven-level signal k(m) having the levels from −3 to +3, to which the symbols a(m) are added—in accordance with Table 11—in an unambiguous manner. The values of the symbols a(m) can be derived from the values of k(m) by adding the value +3 modulo −4 to these values.

The phase variations Δφ(m) associated with the symbols k(m) are determined such, that for two levels which do not differ on a modulo-4 basis (such as −1 and +3) the phase variations ($-\pi/2$, $+3\pi/2$) do not differ on a modulo-2 basis. A customary phase receiver does not make any distinction between two phases which differ for $2\pi$, so that in this receiver no additional modulo $-4$ operation is necessary to derive the symbols a(m) from the phase variations $\Delta\phi(m)$.

After low-pass filtering, the symbols k(m) are applied to a VCO (voltage-controlled oscillator) (FIG. 7) in such a manner that a surface unit of the multi-level signal (amplitude step 1 and a length of a symbol interval T) results in a phase variation of the oscillator signal of $\pi/2$. By this measure, the values k(m) result in the phase variations $\Delta\phi(m)$, which are equal to $k(m)\cdot\pi/2$.

The spectrum of the signal modulated by the phase variations $\Delta\phi(m)$, using the coding circuit shown in FIG. 15, deviates by not more than a few dB from the spectrum shown in FIG. 9. The advantageous operation of the coding circuit shown in FIG. 15 can be explained as follows.

The probability of the occurrence of a phase variation of 0, $\pi/2, \pi, 3\pi/2$ radians into the positive or the negative direction for a random sequence of input symbols a(m) amounts, for the device shown in FIG. 15, to, in this order, $\frac{1}{4}, \frac{3}{8}, \frac{1}{4}$ and $\frac{1}{8}$. The phase variations having the highest value occur with the least probability. This is an important factor for reducing the spectrum of the angle-modulated signal.

Figure 16:
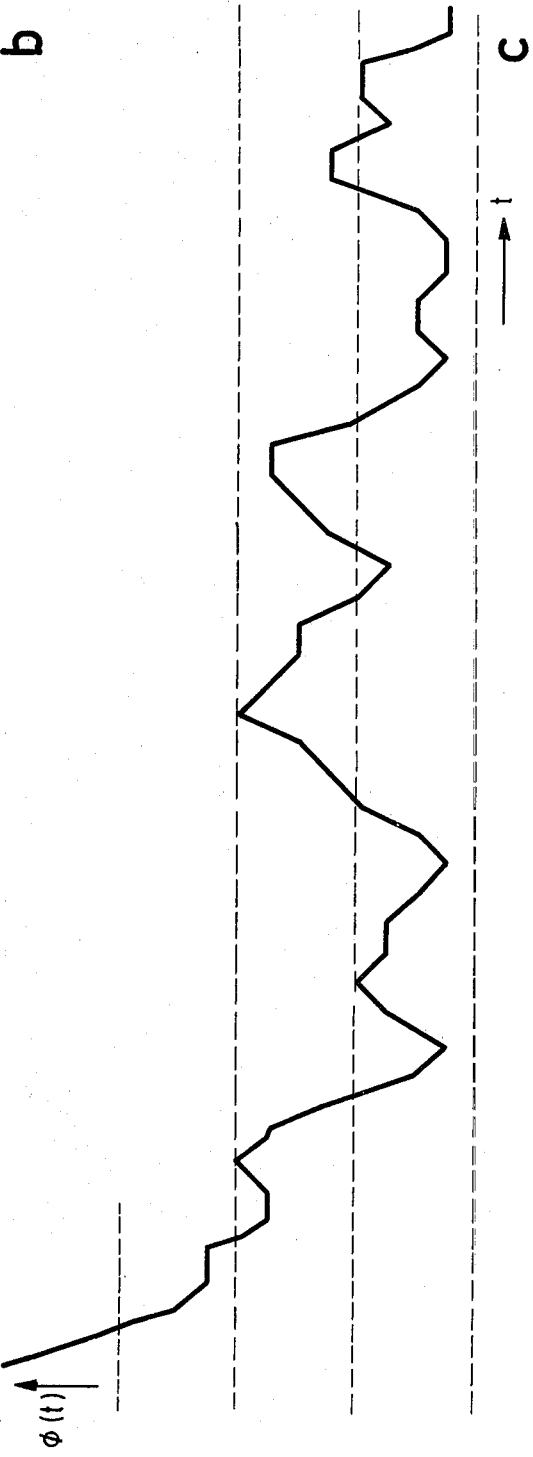
FIGS. 16a–16c show time diagrams.

A further factor is that the transfer characteristic of the network, formed by adder 50 and delay section 49 has a maximum at direct current. This means that the network has the tendency to counter changes in the output signal. For the phase variation this means the tendency to maintain the average slope. This is manifest in FIG. 16, wherein a pseudo-random sequence of symbols a(m) is shown in line a, the sequence of output symbols k(m) of the coding device of FIG. 15 in line b and wherein time diagram c illustrates the phase variation, assuming that the phase changes linearly in a symbol interval. From time diagram c it is seen that the phase undulates with few waves of a great amplitude and, in general, a uniform phase variation, the variations in the peaks and valleys excepted.

Other possibilities within the concept of this application for reducing the spectrum are the possibilities to use an input signal having a number of levels differing from four. In the case of three levels, the phase variations are 0, $2\pi/3$ and $4\pi/3$ radians and a choice between a positive phase variation and a negative phase variation can be created for two of the levels.

It is furthermore possible to choose the number of values of k(m) to be greater by introducing phase variations exceeding $2\pi$. It may be advantageous to replace a phase variation in a certain direction by a larger phase variation in the opposite direction, if this causes the second time derivative of the phase to decrease. Introducing more than two possibilities for the phase variation associated with an input symbol, will, however, result in elaborate algorithms for determining the choice between the various possibilities.

What is claimed is:

1. A system for transmitting n-level data signals from a transmitter to a receiver, the transmitter comprising a carrier oscillator and a modulator connected thereto for generating an angle-modulated carrier having a substantially constant amplitude and a continuous phase, characterized in that the modulator comprises means for converting n-level data signals into intermediate k-level signals wherein k is greater than n, at least one of the n-level data signals having associated therewith two symbols of the intermediate k-level signal, the k-levels of the intermediate multi-level signal corresponding with the phase variations of the carrier signal in one symbol interval of the sequence ranging from $-(k-1)\pi/n$ and to $+(k-1)\pi/n$ in increments of a $2\pi/n$ in a one-to-one relationship and means for causing said phase variations to occur gradually, and that the receiver is formed by a differential n-phase receiver which comprises means for detecting in each symbol interval one out of n different phase variations in multiples of $2\pi/n$.

2. A system as claimed in claim 1, characterized in that said modulator further comprises means for choosing between said two symbols of the k-level signal in dependence on the variation of the phase of the angle-modulated carrier in at least the two preceding symbol intervals.

3. A system as claimed in claim 1, characterized in that said means for converting the n-level data signal into the k-level intermediate signal comprises means for forming an n-level difference signal, by subtracting a second n-level signal modulo-n from the n-level data signal, and a k-level sum signal by adding the second n-level signal linearly to the n-level difference signal, the second n-level signal being derived by means of time delay from the n-level difference signal.

4. A system as claimed in claim 2, characterized in that the symbols of the k-level signal having associated therewith the same symbol of the n-level data signal have corresponding phase variations which differ by $2\pi$.

* * * * *